United States Patent

Hagino et al.

[11] Patent Number: 5,523,798
[45] Date of Patent: Jun. 4, 1996

[54] CIRCUIT FOR AUTOMATICALLY ADJUSTING SIGNAL SEPARATION IN Y/C SEPERATION COMB FILTER

[75] Inventors: Hideyuki Hagino, Kumagaya; Mitsumo Kawano, Yokohama, both of Japan

[73] Assignee: Kabushiki Kaisha Toshiba, Kawasaki, Japan

[21] Appl. No.: 216,418

[22] Filed: Mar. 23, 1994

[30] Foreign Application Priority Data

Mar. 23, 1993 [JP] Japan ................................ 5-064326

[51] Int. Cl.6 ............................................................ H04N 9/64
[52] U.S. Cl. ....................... 348/665; 348/666; 348/667
[58] Field of Search ................................. 348/663–670

[56] References Cited

U.S. PATENT DOCUMENTS 5,267,027  11/1993  Ugaki et al. .......................... 348/665

FOREIGN PATENT DOCUMENTS 210993   1/1990  Japan .
4114591  4/1992  Japan .

Primary Examiner—Victor R. Kostak
Assistant Examiner—Nathan J. Flynn
Attorney, Agent, or Firm—Oblon, Spivak, McClelland, Maier & Neustadt

[57] ABSTRACT

For realizing more accurately a signal separation of a luminance signal and a chrominance signal, a signal separation automatic adjusting circuit in a YC separation comb filter includes an amplitude adjusting loop for detecting a level of a color signal component remaining in the separated luminance signal to adjust amplitudes in an image signal and a 1H delayed image signal, a first phase adjusting loop for adjusting phases of the image signal and the 1H delayed image signal which are respectively inputted into an adder, and a second phase adjusting loop for adjusting phases of the image signal and the 1H delayed image signal in the manner of suppressing the color signal remaining in the luminance signal. According to the constitution, it is possible to prevent an intermix of the color signal component into the luminance, thereby obtaining the YC separation automatic adjusting circuit having a high accuracy.

5 Claims, 13 Drawing Sheets

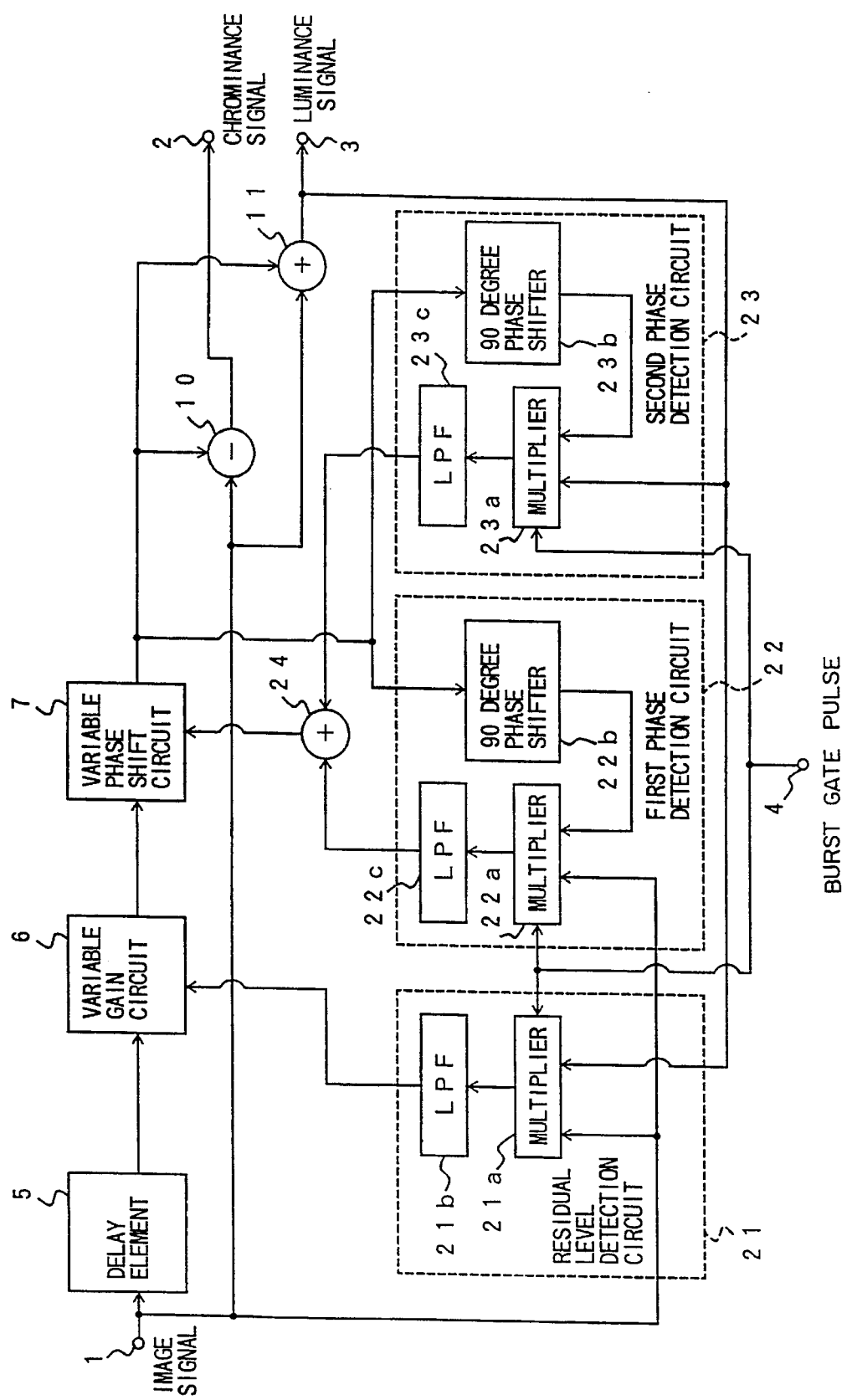
F I G. 5

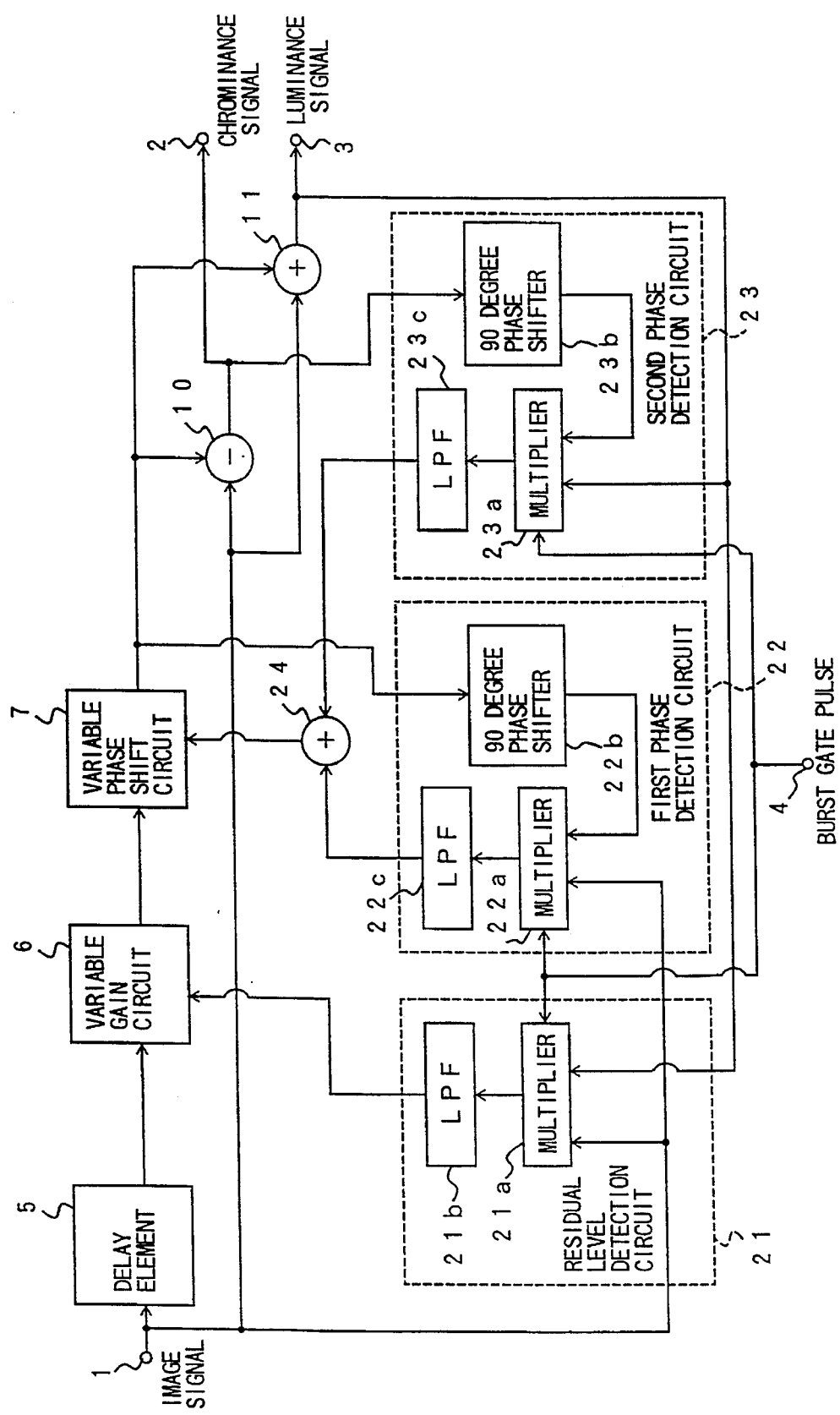
F I G. 11

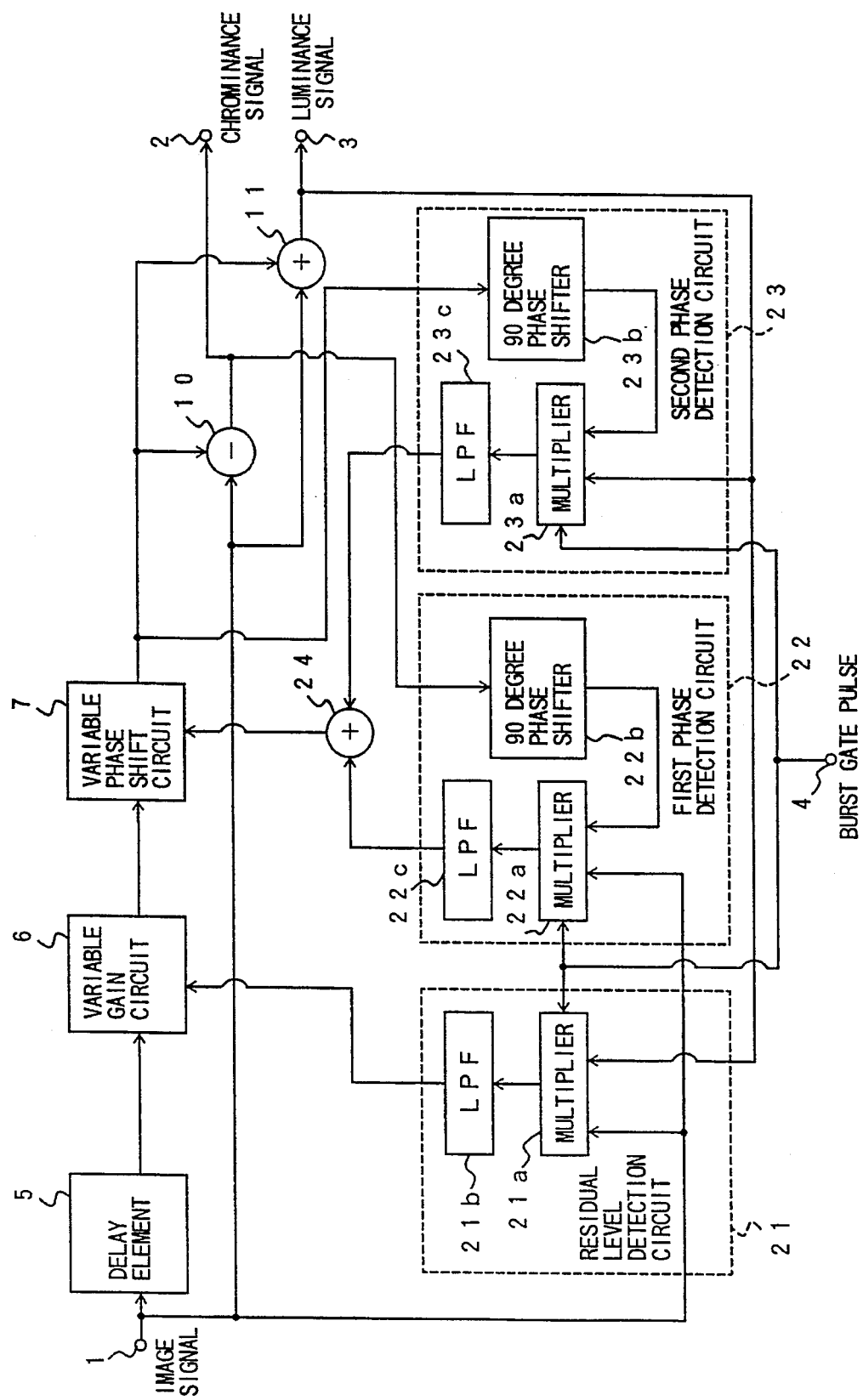
F I G. 13

CIRCUIT FOR AUTOMATICALLY ADJUSTING SIGNAL SEPARATION IN Y/C SEPERATION COMB FILTER

BACKGROUND OF THE INVENTION

The present invention relates to a YC separation circuit for separating a luminance (Y) signal and a chrominance (C) signal from image signals by means of a comb filter, and more specifically, to a YC separation automatic adjusting circuit having a function for automatically adjusting a signal separation.

There is described first a conventional YC separation circuit in reference with FIG. 1 showing an example of a so-called comb filter. The comb filter uses characteristics of carrier color signals in which a phase is inverted by 180 degrees each horizontal scanning so as to separate a luminance signal and a chrominance signal on the basis of the sum and difference of two signals having a time difference corresponding to one horizontal scanning time (1H). In this example, a level of a delay image signal is adjusted in the manner that amplitudes of two image signals are equal to each other, and a shift amount of phase of the delay image signal is adjusted in the manner that the phase difference between two image signals becomes an exact 1H. By adding with such adjusting, chrominance signals are interposed with the same amplitude and the phase difference of 180 degrees each other at an addition and subtraction of two image signals, namely, the luminance signal is separated by the addition and the chrominance signal is separated by the subtraction.

In detail, in FIG. 1, an image signal is supplied to an input terminal 1 from a tuner or a video tape recorder (not shown). The image signal is delayed for a time corresponding to one horizontal scanning time by means of a delay element 5 for delaying a signal such as a charge coupled device (abbreviated in a CCD hereafter) and the like so as to be a delayed image signal which is supplied through a variable gain circuit 6 and a variable phase shift circuit 7 to each one of input terminals of a subtracter 10 and an adder 11, respectively. There is supplied the image signal which is not passed through the delay element 5, to each of the other input terminals of the subtracter 10 and the adder 11, respectively. The subtracter 10 subtracts the delayed image signal from the image signal both of which phases of respective chrominance signals are different from 180 degrees each other, thereby offsetting a luminance signal component to output a chrominance signal to an output terminal 2. The adder 11 adds the delayed image signal with the image signal both of which phases of respective chrominance signals are different from 180 degrees each other, thereby offsetting a chrominance signal to output a luminance signal to an output terminal 3.

The image signal supplied to the input terminal 1 and the delayed image signal outputted from the variable phase shift circuit 7 are supplied to a level detection circuit 8 and a phase detection circuit 9. To both of the detection circuit 8 and 9, a burst gate pulse is supplied corresponding to a position of a color burst signal interposed on the image signal, the color burst signal which is supplied through another input terminal as a burst gate pulse input terminal 4.

The level detection circuit 8 comprises a gate circuit which is controlled with respect to an "ON" condition by a burst gate pulse, a pair of full-wave rectification circuits, and a pair of low-pass filters.

One of the level detectors detects a level of the color burst signal in the image signal, while the other level detector detects a level of the color burst signal in the delayed image signal. Furthermore, detected two signal levels are supplied to a differential amplifier (not shown in the figure) which detects the difference between the levels. The level difference is supplied to the variable gain circuit 6 as a gain control signal for adjusting the levels of the image signal and the delayed image signal respectively supplied to each of the input terminals of the subtracter 10 and the adder 11 in the manner that the levels of both of the signals are equal to each other.

The phase detection circuit 9 comprises a pair of gate circuits, a pair of 90-degree phase shifters, a pair of multipliers, and a pair of low-pass filters which smooth outputs of the multipliers, respectively. The image signal is supplied to one of input terminals of the multiplier through the gate circuit and the 90-degree phase shifter on one side, while the delayed image signal is supplied to the other of input terminals of the multiplier through the gate circuit and the 90-degree phase shifter on the other side. The phase detection circuit 9 corresponds to the supply of the burst gate pulse, compares phases of the color burst signals of the image signal and the delayed image signal, respectively, and supplies an error signal as a phase shift adjusting signal to the variable phase shift circuit 7 corresponding to the phase difference of the image signal and delayed image signal, thereby adjusting the phase difference to be kept to 180 degree between the color signals of two image signals which are supplied to the subtracter 10 and the adder 11, respectively.

An ensure of a detecting precision of the level detection circuit and the phase detection circuit is essential to operate the above-mentioned YC separation automatic adjusting circuit along the purpose of the provision thereof. It is generally required that a signal separation performance should be more than −30 dB in the YC separation. Therefore, the above-mentioned level detection circuit and phase detection circuit are required to have a high detecting precision.

However, it is quite difficult to precisely make the 90 degree phase shift circuit which uses in the phase detector. Furthermore, even though an amplitude and a phase of the image signal and the delayed image signal which are supplied to the adder and subtracter, coincide with each other, there are a discrepancy of the gain with respect to two input signals into the adder and subtracter and a discrepancy of the signal delay time, thereby reducing a signal noise ratio (S/N) of the signal separation caused by the addition and subtraction of the image signal and delayed image signal.

SUMMARY OF THE INVENTION

Accordingly, an object of the present invention is to provide a YC separation automatic adjusting circuit capable of more precisely separating a luminance signal from a chrominance signal in an image signal.

In order to achieve the above object, a YC separation automatic adjusting circuit according to the present invention comprises a first signal path for transmitting an image signal; a second signal path for transmitting a delayed image signal which is generated from the image signal by delaying for a predetermined time; a subtracter for obtaining a chrominance signal by a subtraction between the image signal through the first signal path and the delayed image signal through the second signal path; an adder for obtaining a luminance signal by an addition of the image signal through the first signal path and the delayed image signal through the second signal path; reference color burst signal generation means for generating a reference color burst signal having the same phase as a color burst signal which is included at least in the image signal; a residual burst signal level detection circuit for performing a synchronous detection of a color burst signal component of the luminance signal on the basis of the reference color burst signal to generate a level control signal corresponding to a level of the color burst signal component remaining in the luminance signal; a first phase detection circuit for generating a first phase shift control signal corresponding to a phase difference between color burst signals each other which are taken out from the image signal and the delayed image signal, respectively; a second phase detection circuit for performing a phase detection of the color burst signal component of the luminance signal on the basis of the reference color burst signal and for generating a second phase shift control signal corresponding to a phase difference between the color burst signals each other remaining in the reference color burst signal and the luminance signal, gain adjusting means for adjusting a gain between the first and second signal paths corresponding to the level control signal; and delay adjusting means for adjusting a delay between the first and second signal paths corresponding to the first and second phase shift control signals.

The residual burst signal level detection circuit comprises a phase synchronous type level detector (a multiplier and a low pass filter) to which the color burst signal and the separated luminance signal are supplied, thereby extracting the level of the burst signal component remaining in the luminance signal. The gain between the first and second signal paths is regulated in the manner of offsetting the residual color burst signal component corresponding to the extracted level.

The first phase detection circuit roughly regulates the delay time difference between the first and second signal paths in the manner of removing a phase difference between the color burst signals included in the image signal and the delayed image signal, respectively. The second phase detection circuit minutely regulates the delay time difference between the first and second signal paths in the manner of removing the residual component of the chrominance signal from the luminance signal.

As a result, three feedback loops are formed to sufficiently suppress the color burst components remaining in the luminance signals, thereby obtaining a YC separation automatic adjusting circuit having a high accuracy.

As described above, by the YC separation automatic adjusting circuit according to the present invention, since there are provided a level feedback loop, a feedback loop for roughly adjusting a phase, and a feedback loop for minutely adjusting a phase between a delaying path and a non-delaying path of the image signal in order to sufficiently suppress the color burst components remaining in an output of the adder of the comb filter, it is possible to obtain the YC separation automatic adjusting circuit having a high accuracy and capable of suppressing a cross talk component in the luminance signal as low as possible.

BRIEF DESCRIPTION OF THE DRAWINGS

In the accompanying drawings:

FIG. 5 is a block diagram showing a YC signal separation automatically adjusting circuit according to a second embodiment of the present invention as a concrete example of the circuit shown in FIG. 2;

FIG. 11 is a block diagram showing a YC signal separation automatically adjusting circuit according to an eighth embodiment of the present invention as a concrete example of the circuit shown in FIG. 10;

FIG. 13 is a block diagram showing a YC signal separation automatically adjusting circuit according to a tenth embodiment of the present invention as a concrete example of the circuit shown in FIG. 12.

DETAILED DESCRIPTION OF THE PREFERRED EMBODIMENTS

Figure 1:
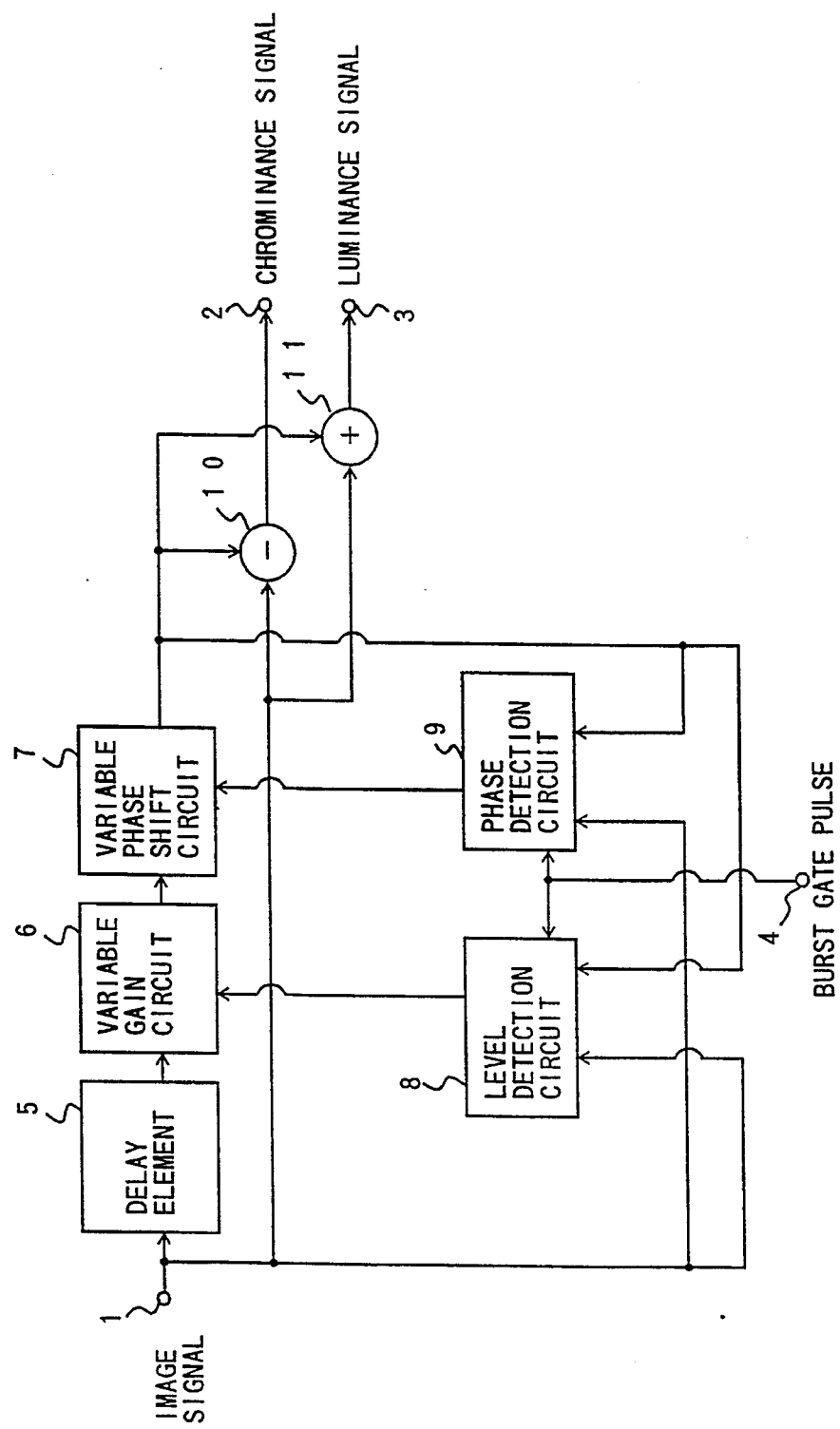
FIG. 1 is a circuit diagram showing the conventional YC signal separation automatically adjusting circuit.
Figure 2:
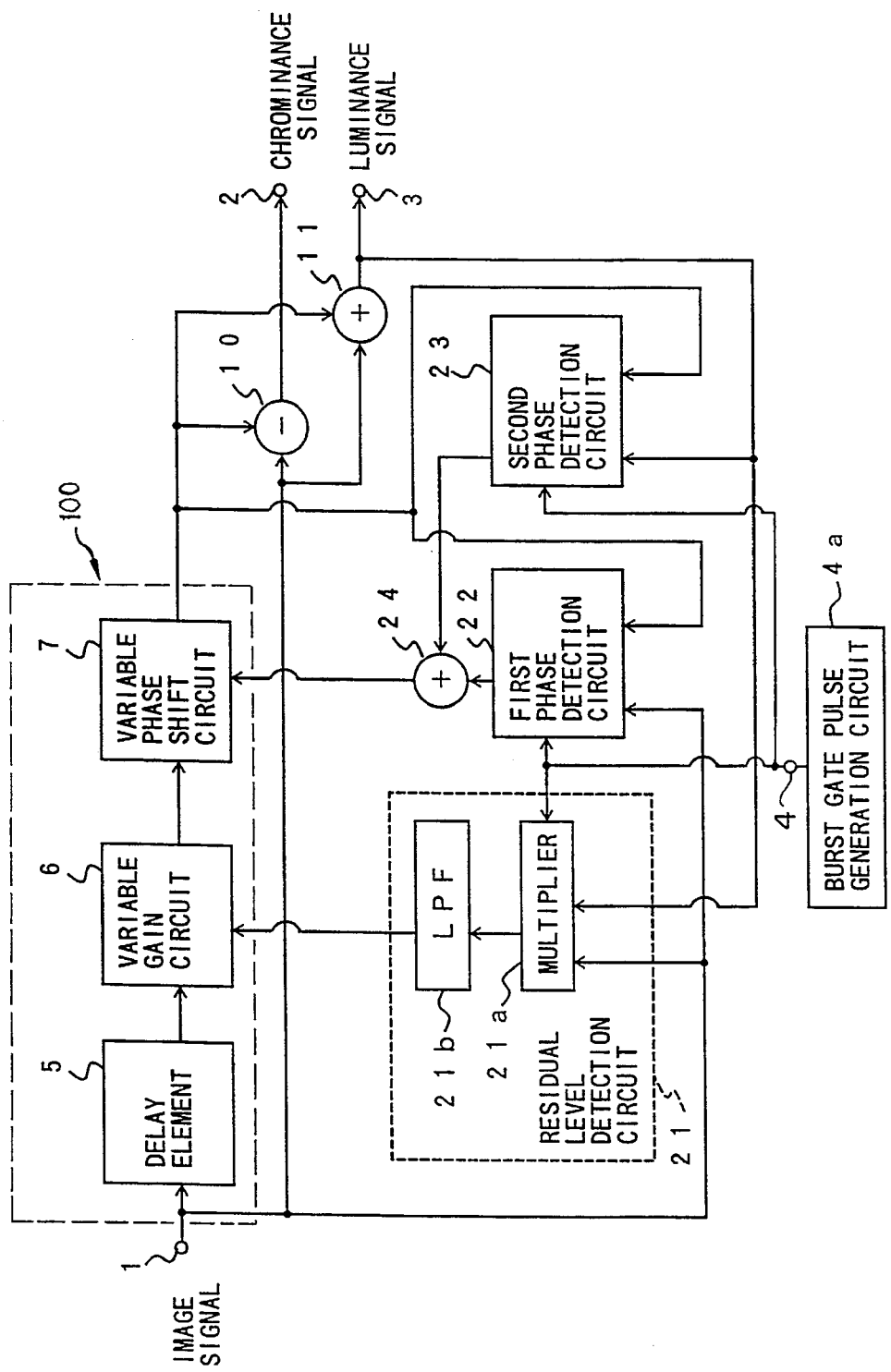
FIG. 2 is a block diagram showing a YC signal separation automatically adjusting circuit according to a first embodiment of the present invention.

There will be described in detail a YC separation circuit according to preferred embodiments of the present invention in reference with the attached drawings. FIG. 2 shows an example of the present invention. Portions in FIG. 2 which correspond to those in FIG. 1, is attached with the same numerals, thereby eliminating the duplicated description.

An image signal supplied to an input terminal 1 is applied to a reference color burst signal generator 100. In the generator 100, the image signal is delayed corresponding to a 1H by a delay element 5 such as a charge coupled device (CCD) and the like to generate a delay image signal so as to supply to input terminals of a subtracter 10 and an adder 11, respectively, through a variable gain circuit 6 and a variable phase shift circuit 7. The image signal which is not passed through the delay element 5, is supplied to the other internal terminals of the subtracter 10 and adder 11. Here, a first signal path is formed by a signal path from the input terminal 1 to the other input terminals of the subtracter 10 and the adder 11, respectively. A second signal path is formed by a signal path from the input terminal 1 through the delay element 5, the variable gain circuit 6 and the variable phase shift circuit 7 to input terminals of the subtracter 10 and the adder 11, respectively. The subtracter 10 performs a subtraction between the image signal and the delayed image signal in which phases of chrominance signals included in both signals are 180 degrees different from each other, separates the chrominance signal by offsetting luminance signal components, and outputs the chrominance signal to an output terminal 2. The adder 11 adds the image signal and the delayed image signal in which phases of chrominance signals of both signals are 180 degrees different froma each other, separates the luminance signal by offsetting chrominance signal components, and outputs the luminance signal to an output terminal 3. In order to sufficiently offset the luminance signal or the chrominance signal, it is possible to coincide with the amplitudes and phases between the image signal and the delayed image signal in the adder and the subtracter under the condition that correlation between adjacent scanning lines is high. Therefore, there are provided residual burst signal level detection circuit 21, a first phase detection circuit 22 and a second phase detection circuit 23.

The residual burst signal level detection circuit 21 detects a level of color burst signal components remaining in the separated luminance signal. The detected level is supplied as a gain control signal to the variable gain circuit 6 as gain adjusting means to regulate an amplitude of the delayed image signal supplied to the adder 11 in the manner that the residual level of the color burst signal components is suppressed.

A feedback loop is formed for roughly adjusting an amplitude of the delayed image signal in the manner that the residual level of the color burst signal components is suppressed by the variable gain circuit 6, the variable phase shift circuit 7, the subtracter 10 and the residual burst signal level detection circuit 21.

The first phase detection circuit 22 compares both of the color burst signals of the image signal and the delayed image signal to detect the phase difference. The first phase shift control signal corresponding to the phase difference is supplied to the variable phase shift circuit 7 as delay adjusting means to regulate phases of the image signal and the delay image signal which are supplied to the subtracter 10 and the adder 11. A roughly adjusting feedback loop for a phase control is formed by the variable phase shift circuit 7 and the first phase detection circuit 22.

When the color burst signal remains in the luminance signal as an output of the adder 11, the second phase detection circuit 23 compares phases of the color burst signal and the residual burst signal to output the phase difference. The second phase shift control signal corresponding to the phase difference is supplied to the variable phase shift circuit 7 to be minutely adjusted in the manner that the color burst signal does not remain in the luminance signal which is positioned at the output terminal of the adder 11, namely, the chrominance signal in the luminance signal is sufficiently removed, thereby performing a minute adjustment for the phase shift of the delayed image signal. The variable phase shift circuit 7, the adder 11 and the second phase shift detection circuit 23 form a minute adjusting feedback loop for a phase (signal delay) control. An adder 24 adds an output of the second phase detection circuit 23 with an output of the first phase detection circuit 22 so as to supply an additional signal to the variable phase shift circuit 7.

The residual burst signal level detection circuit 21 can be constituted from a multiplier 21a and a low pass filter 21b.

Figure 3:
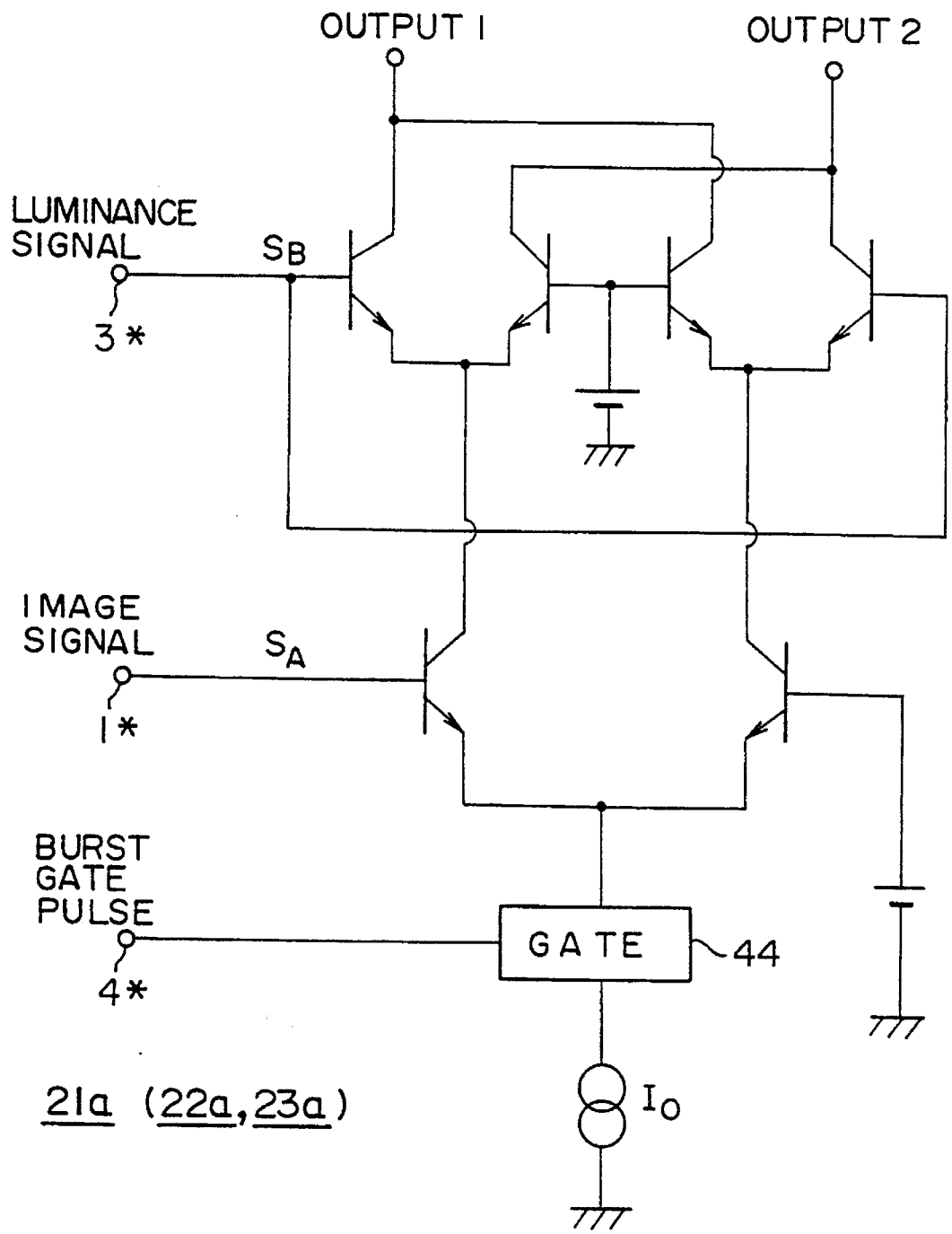
FIG. 3 is a circuit diagram showing a detailed configuration of a multiplier of the YC signal separation circuit used in all embodiments from first to eighth of this invention.

The multiplier 21a is comprised of a double balance type differential amplifier driven by a current source $I_o$, as shown in FIG. 3, thereby supplying the luminance signal and the image signal through two input terminals 3* and 1* of the differential amplifier, respectively. A burst gate pulse is supplied to a gate 44 through a terminal 4* which is connected to the terminal 4, to extract the color burst signal from the image signal. Furthermore, a component corresponding to the color burst signal is extracted from the luminance signal to input it into the multiplier. The burst gate pulse is generated in a burst gate pulse generation circuit 4a so as to supply to the gate through the terminal 4.

Figure 4:
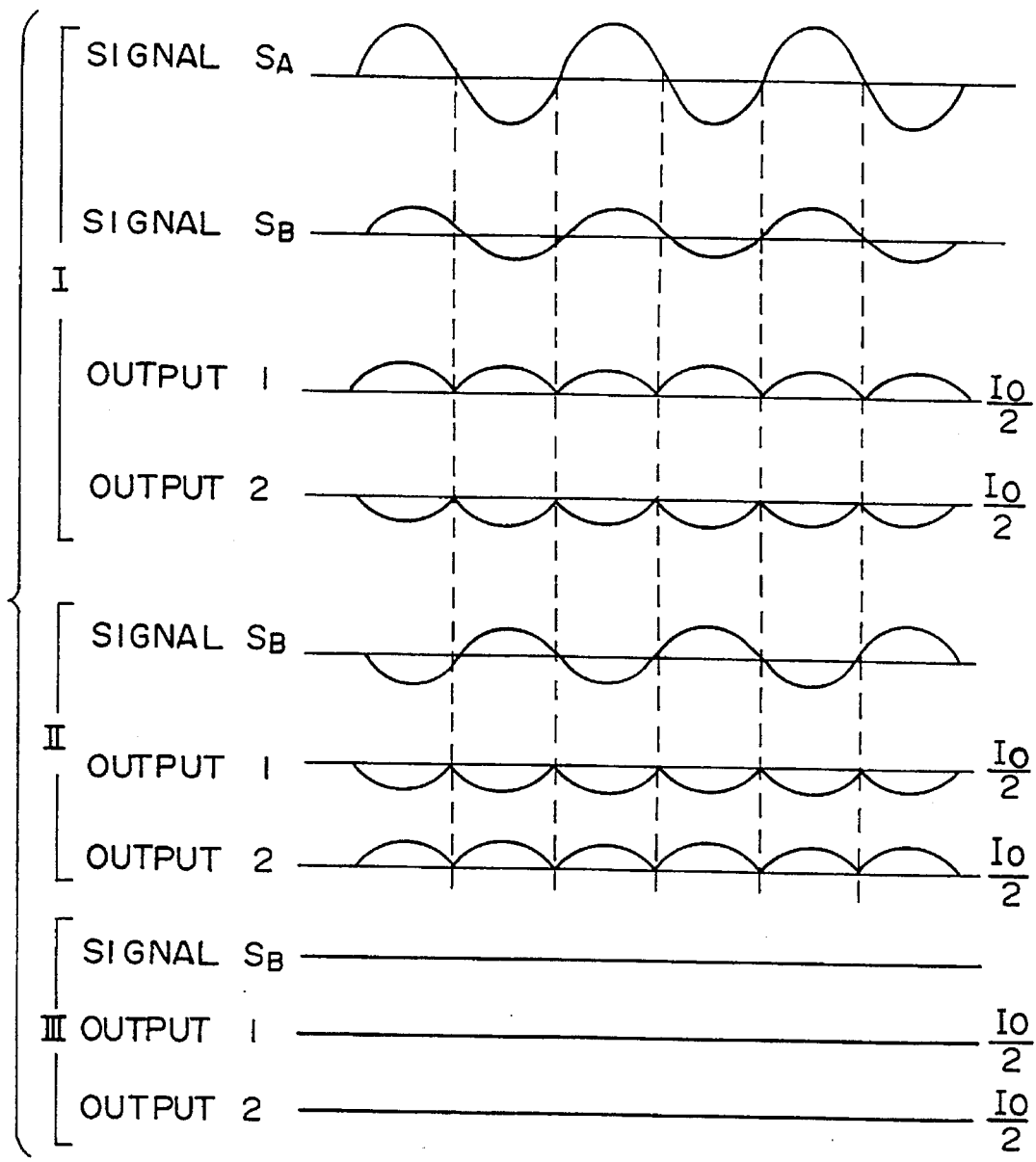
FIG. 4 is a chart of signal waveforms for explaining operation of the multiplier shown in FIG. 3.

FIG. 4 shows operation of the multiplier. As shown in a mode I in FIG. 4, when a signal $S_A$ corresponding to the color burst signal in the image signal and a signal $S_B$ corresponding to the residual burst signal component in the luminance signal are existing under a condition of an in-phase, an output $O_1$ of the multiplier becomes a current more than $I_o/2$ and an output $O_2$ becomes a current less than $I_o/2$. When the signal $S_B$ is a negative-phase corresponding to the signal $S_A$ as shown in a mode II, an output $O_1$ of the multiplier becomes a current less than $I_o/2$ and an output $O_2$ becomes a current more than $I_o/2$. When the burst signal component does not remain in the signal $S_B$ as shown in a mode III, the outputs $O_1$ and $O_2$ of the multiplier become a constant current $I_o/2$, respectively. Namely, when the outputs are under the condition of "$O_1=O_2$", the luminance signal has no chrominance signal. Accordingly, the difference signal between the outputs $O_1$ and $O_2$ are supplied to the variable gain circuit 6 through the low pass filter 21b so as to enable the suppression of the chrominance signal component in the luminance signal. Since only the color burst signal is supplied to the input terminal on one side of the multiplier, it is possible to use not only image signal but also the delayed image signal and the chrominance signal.

Even though the adjusting circuit according to the first embodiment shown in FIG. 2 has the detailed configuration with respect only to the residual level detection circuit 21, the first and second phase detection circuits 22 and 23 also can provide the detailed configuration as shown in FIG. 5 showing a YC separation automatically adjusting circuit according to a second embodiment of the present invention.

In FIG. 5, the first phase detection circuit 22 is comprised of the a multiplier 22a, a 90 degree phase shifter 22b and a low pass filter 22c. The delayed image signal is delayed with 90 degrees by the 90 degree phase shifter 22b in a phase of a carrier color signal to be supplied to one input terminal of the multiplier 22a. The image signal is supplied to the other input terminal of the multiplier. The multiplier 22a can be used by the same constitution shown in FIG. 3. The waveforms of the color burst signal of the image signal and the color burst signal which is shifted in a phase with 90 degrees and exists in the delayed image signal, are shaped by a limiter (not shown) and after that, are multiplied with each other. The multiplied output is smoothed by the low pass filter 22c. When the phases of the image signal and the delayed image signal are equal to each other, an average value of the output $O_1$ of the multiplier is equal to an average value of the output $O_2$ of the multiplier. When the image signal delays with the delayed image signal, the average value of the output $O_1$ of the multiplier decreases, while the average value of the output $O_2$ increases. When the image signal advances to the delayed image signal, the average value of the output $O_1$ of the multiplier increases, while the average value of the output $O_2$ decreases. The difference signal between such two average values of the outputs is supplied to the low pass filter so as to obtain the first phase shift control signal. The first phase shift control signal is supplied through an adder 24 to the variable phase shift circuit 7 in which the phase of the delayed image signal is regulated.

The second phase detection circuit 23 is comprised of a multiplier 23a, a 90 degree phase shifter 23b and a low pass filter 23c. The delayed image signal is delayed with 90 degrees in the phase of the carrier color signal by the 90 degree phase shifter 22b so as to supply the delayed signal to one of input terminals of the multiplier 23a. The luminance signal is supplied to the other input terminal of the multiplier 23a. The multiplier 23a can be used from the same constitution as shown in FIG. 3. The waveforms of the color burst signal remaining in the luminance signal and the color burst signal of the delayed image signal which is shifted of the phase with 90 degrees, are shaped by a limiter (not shown) so as to be multiplied. The multiplied output is smoothed by the low pass filter 23c. When the chrominance signal does not exist in the luminance signal, the average value of the output $O_1$ is equal to the average value of the output $O_2$ of the multiplier. When the chrominance signal remains in the luminance signal because the image signal delays to the delayed image signal, the average value of the output $O_2$ of the multiplier decreases, while the average value of the output $O_2$ increases. On the contrary, when the chrominance signal remains in the luminance signal because the image signal advances to the delayed image signal, the average value of the output $O_1$ increases, while the average value of the output $O_2$ decreases. The difference signal between two average values of the outputs $O_1$ and $O_2$ is supplied to the low pass filter 23b in which the second phase shift control signal can be obtained. The second phase shift control signal is supplied through the adder 24 to the variable phase shift circuit 7, in which the phase of the delayed image signal is minutely adjusted.

The first phase detection circuit 22 detects the phases between both the burst signals of the delayed image signal and the non-delayed image signal, while the second phase detection circuit 23 detects the phases between the reference signal (the burst signal) and the differential value obtained by the adder 24. Accordingly, the reference axes for the detection are different from each other in the first and second phase detection circuits 22 and 23. Therefore, since the first and second phase detection circuits are used together, it is possible to realize an excellent phase detection having higher accuracy.

Next, there will be described in detail a YC separation signal automatically adjusting circuit according to a third embodiment of the present invention with reference to FIG. 6.

The adjusting circuit relating to the third embodiment has a configuration that the 90 degree phase shifter 22b of the first phase detection circuit 22 serves as a 90 degree phase shifter of the second phase detection circuit 23, and the LPF 22c of the first phase detection circuit 22 serves as a LPF of the second phase detection circuit 23. Namely, in FIG. 6, the first phase detection circuit 22 comprises the multiplier 22a, 90 degree phase shifter 22b and LPF 22c, while the second phase detection circuit 23 comprises the multiplier 23a, 90 degree phase shifter 22b and LPF 22c. The multiplier 22a and 23a have the same configurations in detail as that shown in FIG. 3, respectively.

Figure 6:
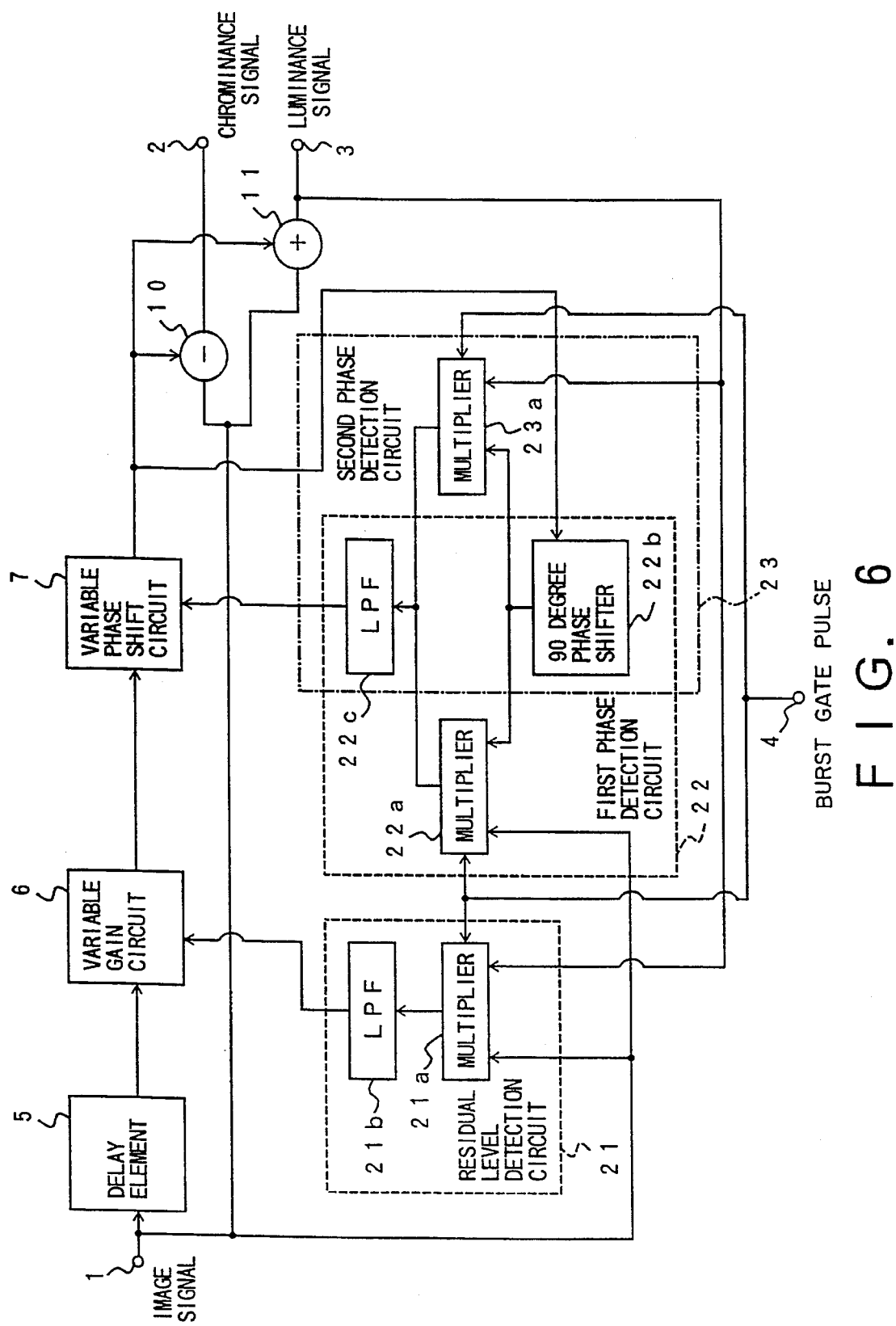
FIG. 6 is a block diagram showing a YC signal separation automatically adjusting circuit according to a third embodiment of the present invention as another concrete example of the circuit shown in FIG. 2.

There is described operation of the adjusting circuit according to the third embodiment with reference to FIG. 6. The delayed image signal outputted from the variable phase shift circuit 7, is supplied to the 90 degree phase shifter 22b which further delays the delayed image signal with 90 degree by a phase of the carrier color signal so as to supply it to particular one terminal of input terminals of the multipliers 22a and 23a, respectively.

The multiplier 22a of the first phase detection circuit 22 performs operation as the same as that of the multiplier 22a of the second embodiment shown in FIG. 5, and the multiplier 23a of the second phase detection circuit 23 performs operation as the same as that of the multiplier 23a of the second embodiment shown in FIG. 5.

The outputs of the multipliers 22a and 23a are supplied to the LPF 22c to be smoothed, respectively. The LPF 22c supplies the first phase control signal to the variable phase shift circuit 7 when the LPF 22c functions as one component of the first phase detection circuit 22, while the LPF 22c supplies the second phase control signal to the variable phase shift circuit 7 when the LPF 22c functions as one component of the second phase detection circuit 23. The variable phase shift circuit 7 adjusts the delayed image signal corresponding to the first phase shift control signal and minutely adjusts the delayed image signal corresponding to the second phase shift control signal.

Figure 7:
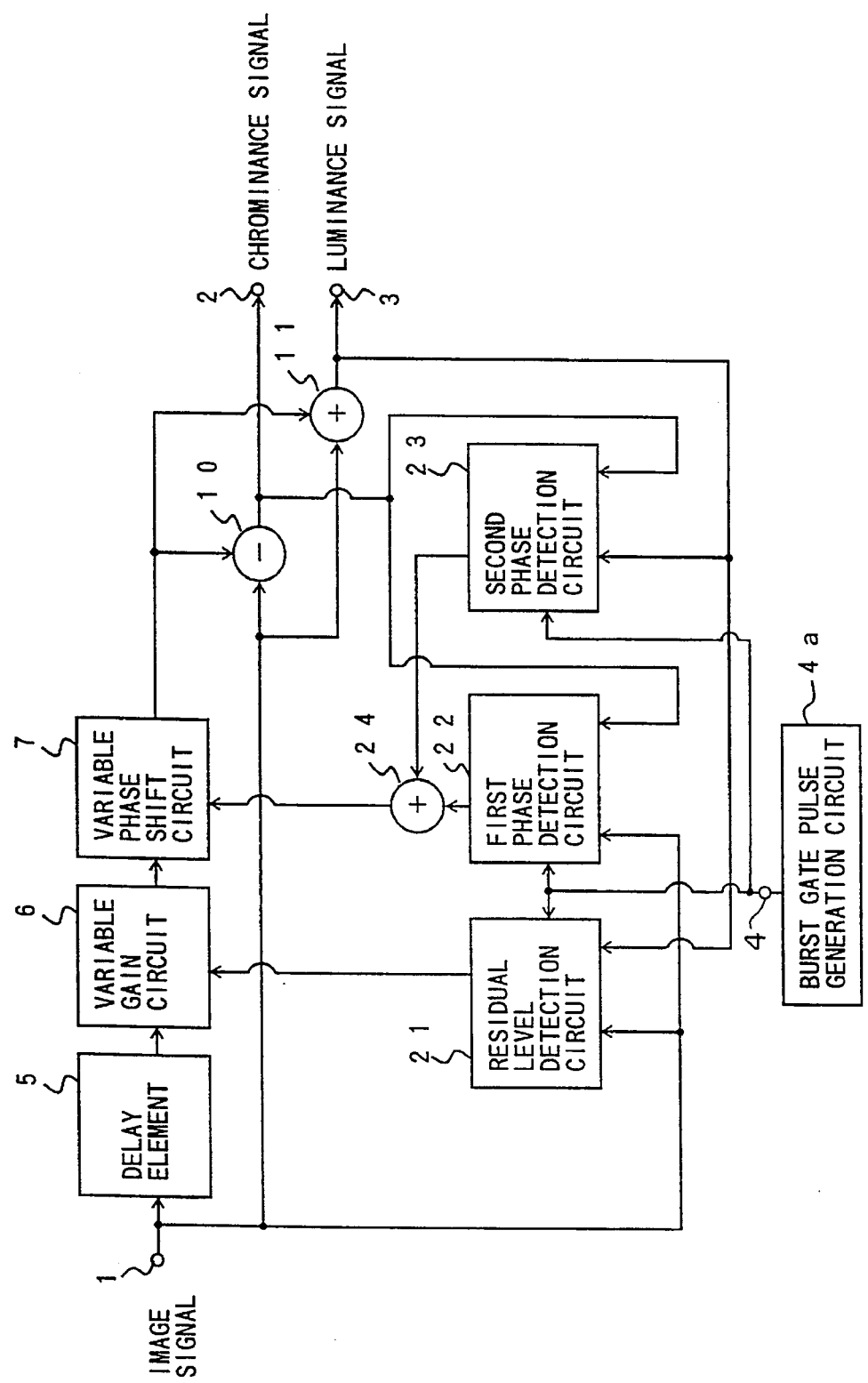
FIG. 7 is a block diagram showing a YC signal separation automatically adjusting circuit according to a fourth embodiment of the present invention having a configuration different from the circuit shown in FIG. 2.

Then, there is described an adjusting cirucit according to a fourth embodiment of the present invention with reference to FIG. 7. The adjusting circuit of the fourth embodiment has the same constitution as the adjusting circuit of the first embodiment shown in FIG. 2 with respect to the residual level detection circuit 21 and the first and second phase detection circuits 22 and 23, and the different point between the first through third embodiments and the fourth embodiment is that the inputs of the 90 degree phase shifters of the first and second phase detection circuits 22 and 23 are both of the outputs of the subtracter 10. Accordingly, even though the adjusting circuit of the fourth embodiment does not perform a signal processing by inputting the delayed image signal such as the previous embodiments, the adjusting circuit of the fourth embodiment inputs the chrominance signal as an output of the subtracter 10 to shift a phase of the chrominance signal with 90 degree, repactively multiplies the phase shifted chrominance signal with image signal and with the lumninance signal, thereby roughly and minutely adjusts the amplitude of the delayed image signal.

Figure 8:
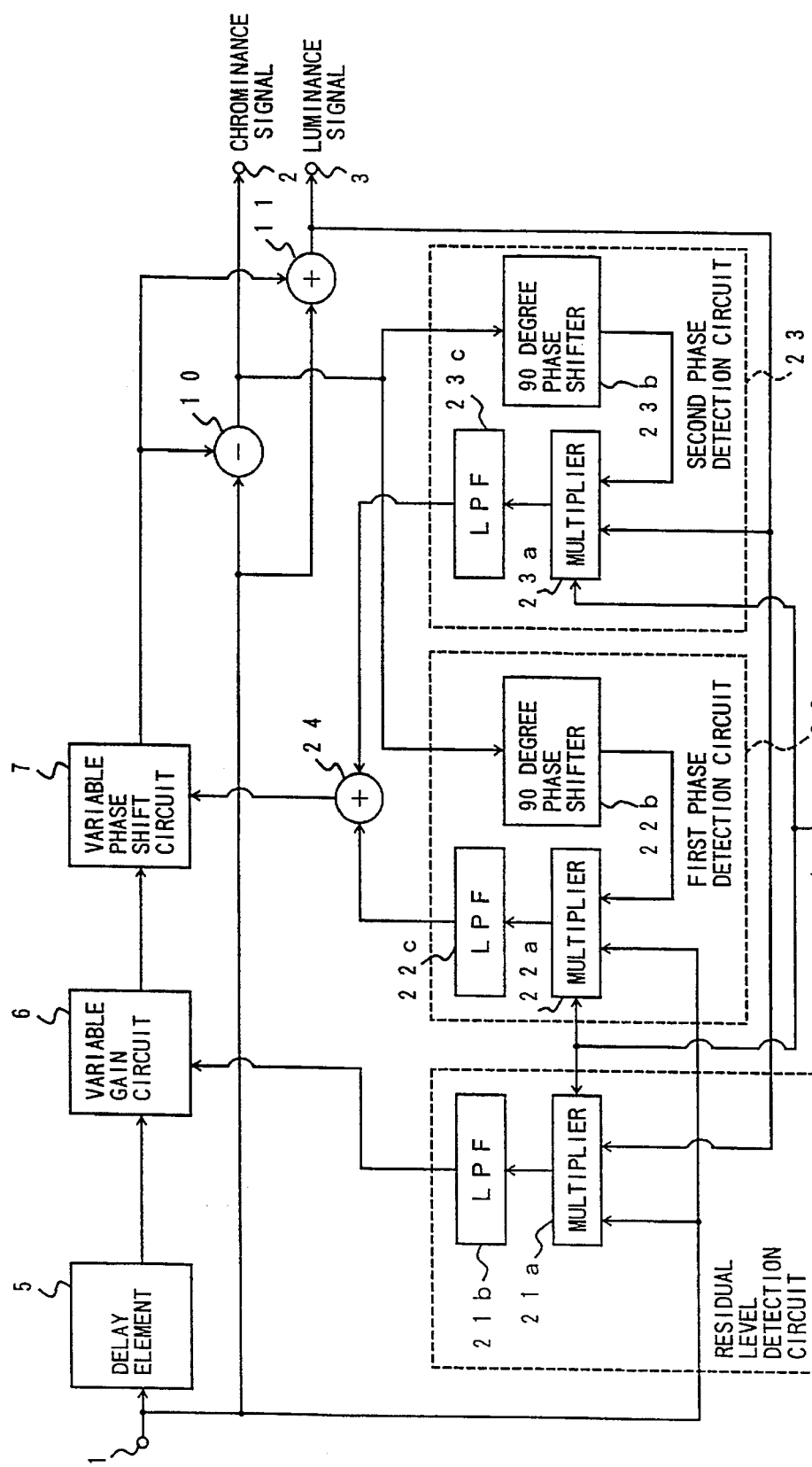
FIG. 8 is a block diagram showing a YC signal separation automatically adjusting circuit according to a fifth embodiment of the present invention as a concrete example of the circuit shown in FIG. 7.

FIG. 8 shows an adjusting circuit according to a fifth embodiment as more detailed configuration of the circuit of the fourth embodiment shown in FIG. 7. The adjusting circuit of the fifth embodiment corresponds to the adjusting circuit of the second ciruict shown in FIG. 5, but has the different point in which inputs of the 90 degree phase shifters 22b and 23b are inputted from the output of the sufbtracter 10 in the same manner of the circuit shown in FIG. 7. Accordingly, the 90 degree phase shifter 22b and 23b shift with 90 degree the chrominance signal outputted from the subtracter 10 and does not shift the delayed image signal outputted from the variable phase shifter 7. Since the other configurations are the same as the adjusting circuit shown in FIG. 5, the duplicational description will be omitted with resprct to the constitutions and operation.

Figure 9:
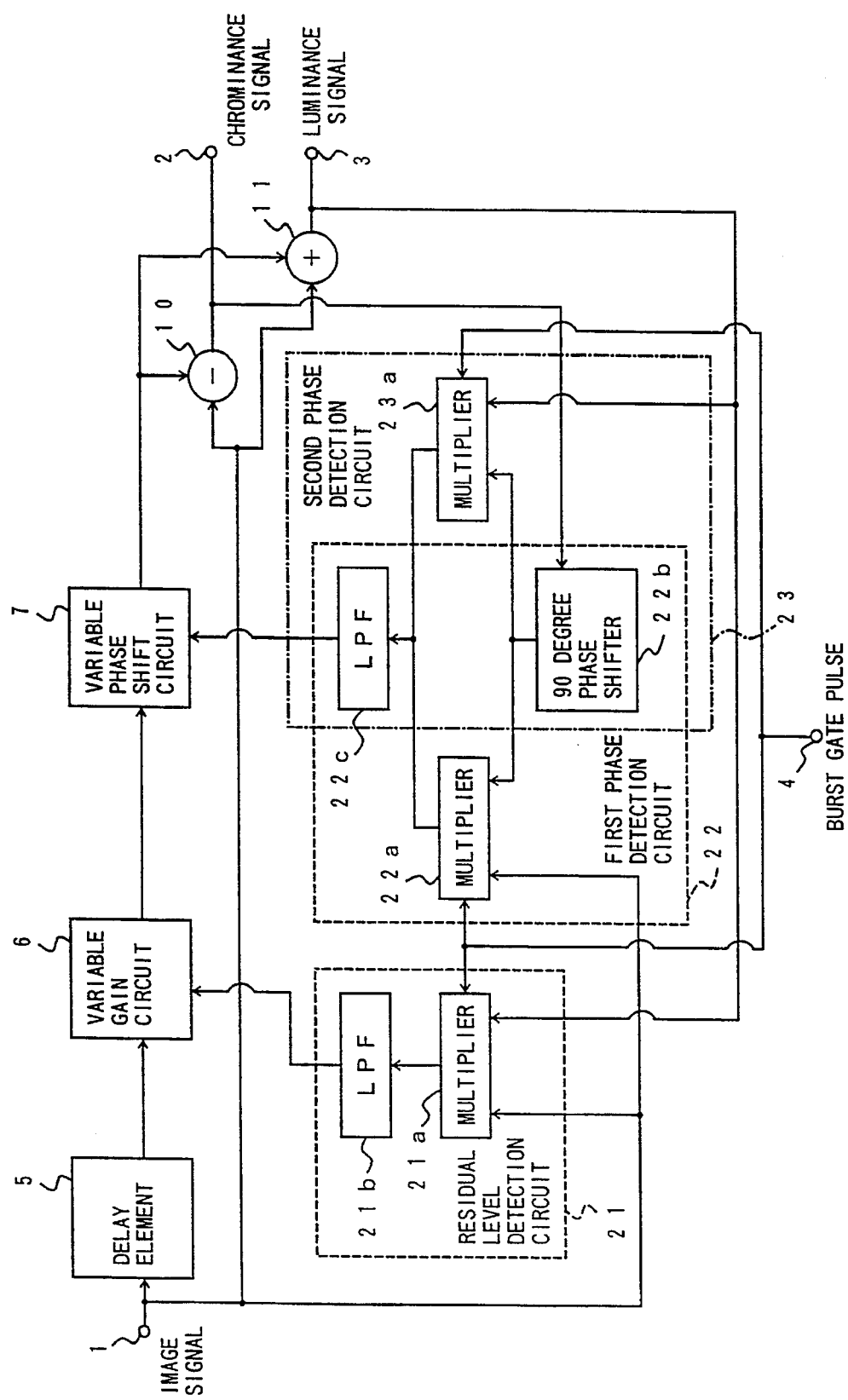
FIG. 9 is a block diagram showing a YC signal separation automatically adjusting circuit according to a sixth embodiment of the present invention as another concrete example of the circuit shown in FIG. 7.

Next, FIG. 9 shows a configuration of an adjusting circuit according to a sixth embodimant of the present invention. The sixth embodiment is one of the more detailed examples of the constitution of the fourth embodiment, and corresponds to the third embodiment shown in FIG. 6. Even though the adjusting circuit shown in FIG. 6 shifts the phase of the delayed image signal outputted from the variable phase shift control circuit 7 with 90 degrees, the adjusting circuit according to the sixth embodiment shown in FIG. 9 shifts the phase of the chrominance signal outputted from the subtracter 10. Since the other constitution and operation are the same as the adjusting circuit shown in FIG. 6, the duplicated description will be omitted.

Here, in the adjusting circuits according to the first through third embodiments shown in FIGS. 2–6, both of the 90 degree phase shifters 22b and 23b of the first and second phase detection circuits 22 and 23 have the inputs supplied from the variable phase shift circuit 7. Further, in the adjusting circuits according to fourth through sixth embodiments shown in FIGS. 7–9, both of the 90 degree phase shifters 22b and 23b of the first and second phase detection circuits 22 and 23 have the inputs supplied from the subtracter 10. However, the present invention is not limited in these embodiments, one of the 90 degree phase shifters 22b and 23b may have an input different from the other 90 degree phase shifter 22b or 23b, which are respectively supplied from different components.

Figure 10:
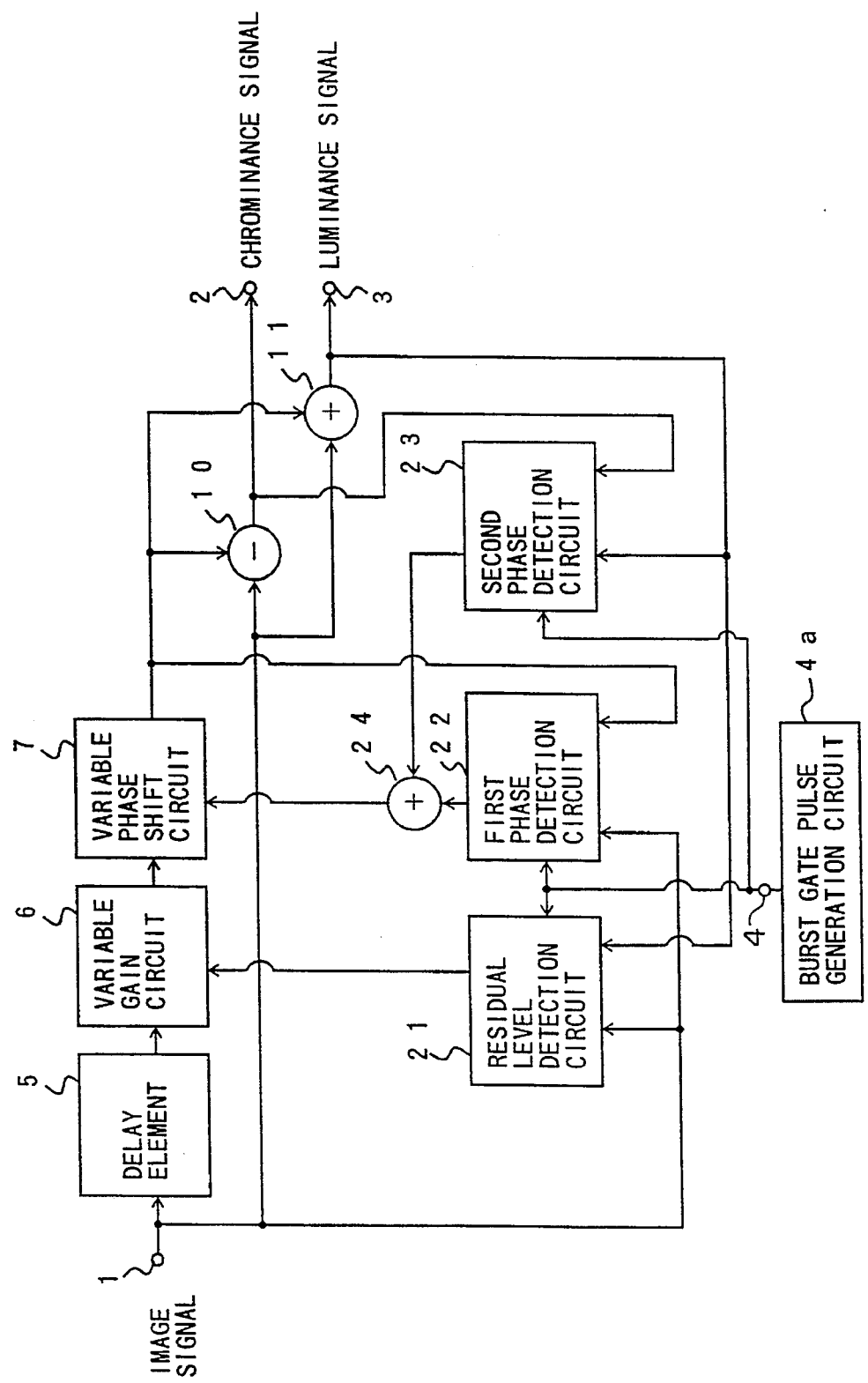
FIG. 10 is a block diagram showing a YC signal separation automatically adjusting circuit according to a seventh embodiment of the present invention having a configuration different from the circuits shown in FIGS. 2 and 7.

For example, in a seventh embodiment shown in FIG. 10, the first phase detection circuit 22 receives the delayed image signal outputted from the variable phase shift circuit 7 in the same manner of the circuit according to the first through third embodiments, while the second phase detection circuit 23 receives the chrominance signal outputted from the subtracter 10 in the same manner of the circuit according to the fourth through sixth embodiments. Since other constitutions and operation are the same as the previous embodiments, the duplicated description will be omitted.

FIG. 11 shows an adjusting circuit according to an eighth embodiment as a concrete example of the seventh embodiment shown in FIG. 10. The adjusting ciruciut of the eighth embodiment has substantially the same configuration as the adjusting circuit according to the second embodiment shown in FIG. 5 and the adjusting circuit according to the fourth embodiment shown in FIG. 8, but respective inputs of both of the 90 degree phase shifters 22b and 23b are different from each other. Namely, the 90 degree phase shifter 22b of the first phase detection circuit 22 receives the delayed image signal outputted from the variable phase shift circuit 7, while the 90 degree phase shifter 23b of the second phase detection circuit 23 receives the chrominance signal outputted from the subtracter 10. Since other constitutions and operation are the same as that of the adjusting circuit shown in FIGS. 5 and 8, there is omitted the duplicated description.

In the adjusting circuit of the kind for the seventh embodiment, it is impossible to provide an embodiment as a concrete example corresponding to those of FIGS. 6 and 9. Because one 90 degree phase shifter posesses as the other 90 degree phase shifter in the first and second phase detection circuits 22 and 23 in the third and sixth embodiments.

Figure 12:
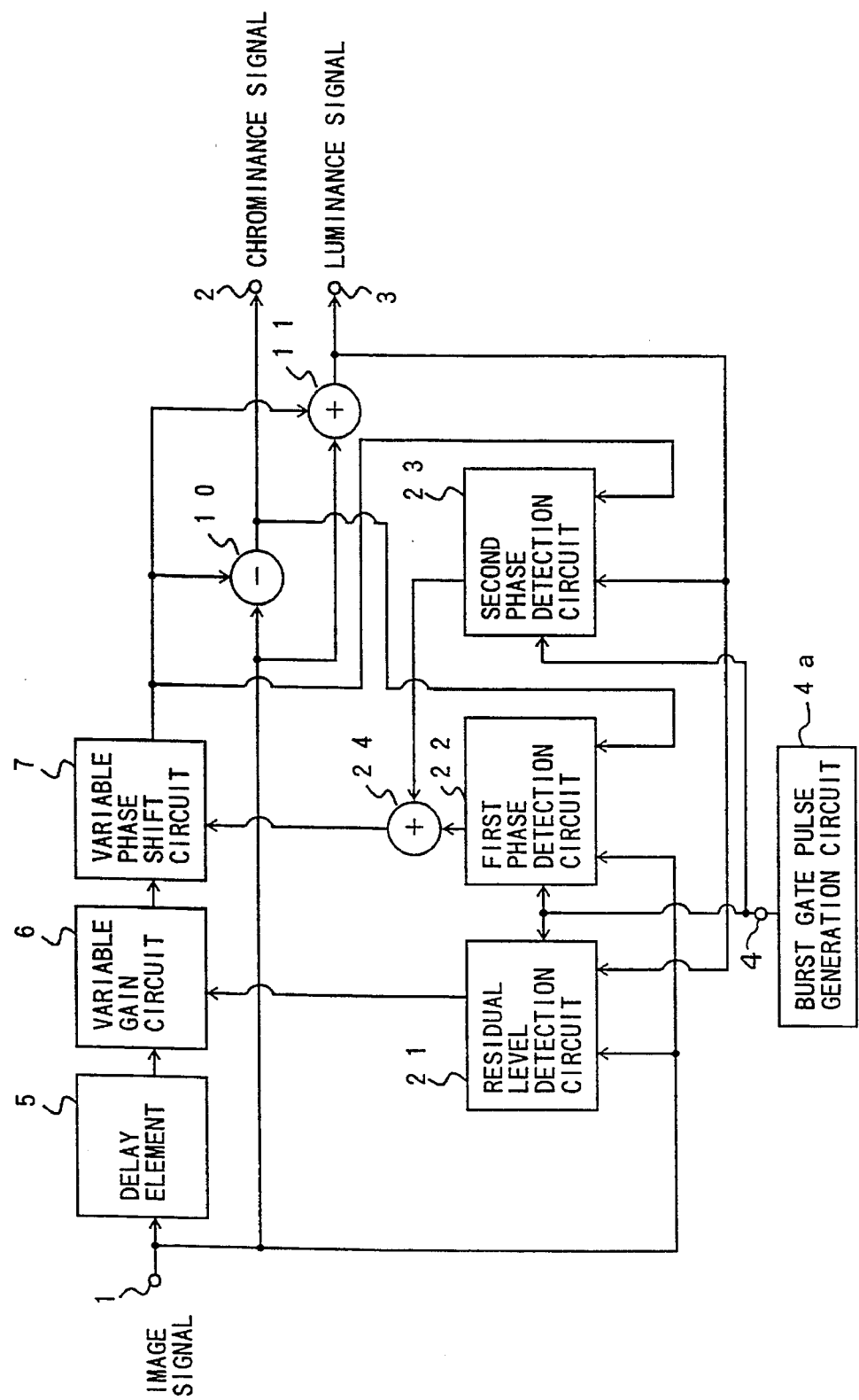
FIG. 12 is a block diagram showing a YC signal separation automatically adjusting circuit according to a ninth embodiment of the present invention having a configuration different from the circuits shown in FIGS. 2, 7 and 10.

FIGS. 12 and 13 are block diagrams respectively showing YC signal separation automatically adjusting circuits according to ninth and tenth embodiments, respectively, as modified examples of the seventh and eighth embodiments shown in FIGS. 10 and 11, respectively.

In the adjusting circuits shown in FIGS. 10 and 11, the first phase detection circuit 22 receives the delayed image signal outputted from the variable phase shift circuit 7, while the second phase detection ciruuct 23 receives the chrominance signal outputted from the subtracter 10. On the contrary, in the ninth and tenth embodiments respectively shown in FIGS. 12 and 13, the first phase detection circuit 22 receives the chrominance signal outputted from the subtracter 10, while the second phase detection circuit 23 receives the delayed image signal outputted from the variable phase shift circuit 7. Since other constitution and operation are the same as those of the previous embodiments, the duplicated description will be omitted.

As described above as the several embodiments, the image signal may be used in the place of the delayed image signal in order to obtain the color burst signal as the reference signal of the second phase detection circuit 23. Furthermore, in the manner of showing another embodiment as shown in FIG. 5 through FIG. 11 in which portions corresponding to those in FIG. 2 are attached by the same numerals in FIG. 2, the color burst signal components of the separated chrominance signal as an output of the subtracter 10 can be used as the reference signal of the second phase detection circuit 23. Still furthermore, when the above-mentioned circuit is configured from a digital circuit, a system clock signal which synchronizes with the carrier color signal can be used as the above-mentioned reference signal.

According to the above constitution and operation, since the luminance signal outputted from the adder 11 is compared with the reference signal (burst signal) to control the variable gain circuit and the variable phase shift circuit in the manner of an absent of the color signal component remaining in the luminance signal, it is possible to obtain the YC separation automatic adjusting circuit having the high accuracy.

What is claimed is:

1. A signal separation automatic adjusting circuit for a YC separation comb filter, comprising:

a first signal path for transmitting an image signal;

a second signal path for transmitting a delayed image signal which is generated by delaying said image signal transmitted through said first signal path for a predetermined time;

a subtractor for obtaining a chrominance signal by performing a subtraction between said image signal transmitted through said first signal path and the delayed image signal transmitted through said second signal path;

an adder for obtaining a luminance signal by adding said image signal transmitted through said first signal path and the delayed image signal transmitted through said second signal path;

reference color burst signal generation means for generating a reference color burst signal having a same phase as a color burst signal included at least in said image signal;

a residual burst signal level detection circuit for performing a synchronous detection with respect to a color burst signal component in said luminance responsive to said reference color signal, and for generating a level control signal corresponding to a level of said color burst signal component remaining in said luminance signal;

a first phase detection circuit for receiving said image signal and said reference color burst signal, for performing a phase detection with respect to color burst signal components in said image signal and said reference color burst signal, respectively, and for generating a first phase shift control signal corresponding to a phase difference between said image signal and said reference color burst signal;

a second phase detection circuit for receiving at least said luminance signal and said reference color burst signal, for performing a phase detection with respect to second color burst signal components in said luminance signal responsive to said reference color burst signal, and for generating a second phase shift control signal corresponding to the phase difference between said reference color burst signal and said luminance signal;

gain adjusting means for adjusting a gain between said first and second signal paths corresponding to said level control signal generated by said residual burst signal level detection circuit; and delay adjusting means for adjusting a delay between said first and second signal paths corresponding to said first and second phase shift control signals.

2. The signal separation automatic adjusting circuit according to claim 1, wherein said reference color burst signal is any of color signals included in said image signal, said delayed image signal and said chrominance signal.

3. The signal separation automatic adjusting circuit according to claim 2, wherein said second signal path is comprised of a delay element, a variable gain circuit and a variable phase shift which are connected in series one another, and said variable gain circuit receives said level control signal which is generated by said residual burst signal level detection circuit.

4. The signal separation automatic adjusting circuit according to claim 1, wherein said second signal path is comprised of a delay element, a variable gain circuit and a variable phase shift which are connected in series one another, and said variable gain circuit receives said level control signal which is generated by said residual burst signal level detection circuit.

5. The signal separation automatic adjusting circuit according to claim 1, wherein said residual burst signal level detection circuit comprises a first multiplier for multiplying said luminance signal as the output of said adder with said image signal, a first low pass filter (LPF) for smoothing a output from said first multiplier.

\* \* \* \* \*

UNITED STATES PATENT AND TRADEMARK OFFICE
CERTIFICATE OF CORRECTION

PATENT NO. : 5,523,798
DATED : June 4, 1996
INVENTOR(S) : Hideyuki HAGINO, et al.

It is certified that error appears in the above-indentified patent and that said Letters Patent is hereby corrected as shown below:

On the title page item [54], and column 1, lines 1-3 the title, should read:

-- [54] CIRCUIT FOR AUTOMATICALLY ADJUSTING SIGNAL SEPARATION IN Y/C SEPARATION COMB FILTER. --

Signed and Sealed this

Seventeenth Day of September, 1996

Attest:

BRUCE LEHMAN

*Attesting Officer*      *Commissioner of Patents and Trademarks*